(12) United States Patent
Kim et al.

(10) Patent No.: US 9,400,048 B2
(45) Date of Patent: Jul. 26, 2016

(54) PLANETARY DRIVE

(71) Applicant: Schaeffler Technologies AG & Co. KG, Herzogenaurach (DE)

(72) Inventors: Dooyong Kim, Kanagawa (JP); Kangen Bae, Kanagawa (JP)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/442,013

(22) PCT Filed: Oct. 2, 2013

(86) PCT No.: PCT/DE2013/200199
§ 371 (c)(1),
(2) Date: May 11, 2015

(87) PCT Pub. No.: WO2014/090233
PCT Pub. Date: Jun. 19, 2014

(65) Prior Publication Data
US 2015/0323057 A1    Nov. 12, 2015

(30) Foreign Application Priority Data

Dec. 14, 2012  (DE) .......................... 10 2012 223 238

(51) Int. Cl.
*F16H 57/08*  (2006.01)
*F16H 57/04*  (2010.01)
*F16H 48/10*  (2012.01)

(52) U.S. Cl.
CPC .......... *F16H 57/0479* (2013.01); *F16H 57/043* (2013.01); *F16H 57/0482* (2013.01); *F16H 57/0483* (2013.01); *F16H 57/082* (2013.01); *F16H 2048/106* (2013.01); *F16H 2057/085* (2013.01)

(58) Field of Classification Search
CPC . F16H 57/082; F16H 57/0479; F16H 57/043; F16H 57/0482
USPC .......................................... 475/159
See application file for complete search history.

(56) References Cited

U.S. PATENT DOCUMENTS

| 4,793,200 | A | * | 12/1988 | McDonald | .......... | F16H 57/0006 74/331 |
| 5,102,379 | A | * | 4/1992 | Pagluica | ............... | F16H 1/2836 475/159 |
| 7,422,540 | B2 | | 9/2008 | Neudecker et al. | | |
| 2010/0007150 | A1 | * | 1/2010 | Ciszak | .................... | F03D 11/02 290/55 |

(Continued)

FOREIGN PATENT DOCUMENTS

| DE | 102010054870 A1 | 6/2012 | |
| DE | 102012206444 A1 | * 10/2013 | ............ F16H 57/082 |

(Continued)

*Primary Examiner* — Roger Pang
(74) *Attorney, Agent, or Firm* — Simpson & Simpson, PLLC

(57) ABSTRACT

A planetary drive having at least one set of first planetary gears on a planet carrier, which gears are disposed radially spaced apart from a central axis and of which every first planetary gear is in toothed engagement with a first central gear, wherein the central gear has the central axis as the axis of rotation thereof, and wherein each of the first planetary gears is respectively mounted on a pin so as to be rotatable about an axis of symmetry of the pin, wherein the pin has internally a lubricating channel extending along the axis of symmetry of the pin and is mounted at least on one side at the end in a planet carrier, and wherein the pin is seated at least on one side at the end of a cup-shaped sleeve seated in the planet carrier.

8 Claims, 2 Drawing Sheets

(56) References Cited

U.S. PATENT DOCUMENTS

2015/0167819 A1* 6/2015 Imai .................. B64C 27/12
   475/159
2015/0247566 A1* 9/2015 McKinzie .......... F16H 57/0479
   475/159

FOREIGN PATENT DOCUMENTS

DE   102014201257 A1 *  9/2014  ............ F16H 57/082
JP      2004108452 A     4/2004
WO    2004079230 A1     9/2004

* cited by examiner

PLANETARY DRIVE

CROSS-REFERENCE TO RELATED APPLICATIONS

The present application is the United States National Stage Application pursuant to 35 U.S.C. §371 of International Application No. PCT/DE2013/200199, filed on Oct. 2, 2013, which application claims priority from German Patent Application No. DE 10 2012 223 238.9, filed on Dec. 14, 2012, which applications are incorporated herein by reference in their entireties.

FIELD

The present disclosure relates generally to planetary drives having at least one set of planet gears on a planet carrier each planet gear having a toothed engagement with a center gear.

BACKGROUND

Such planetary drives are extant in numerous different designs, as differentials as well. Differentials are extant primarily as bevel gear planetary drives, and as so-called spur gear planetary drives, in the classical design. The lubrication of the rolling bearings and toothings in planetary drives is often a problem because the tooth contacts and the rolling bearings are difficult for lubricating oil to reach, and pressure lubrication and/or oil-spray lubrication is difficult to implement.

BRIEF SUMMARY

The problem addressed by the present disclosure is that of improving the lubrication of the toothed engagement and the bearing of the planet gears.

According to aspects illustrated herein, there is provided a planetary drive having a first set of first planet gears on a planet carrier, said planet gears arranged at a radial distance from a central axis, each first planet gear having a toothed engagement with one first center gear, wherein the center gear has the central axis as its axis of rotation, and wherein each of the first planet gears is mounted on a pin in a manner allowing rotation about an axis of symmetry of the pin, and the pin has an interior lubrication channel extending along the axis of symmetry of the pin, and is mounted by the end, on at least one end thereof, in a planet carrier, wherein the pin sits at least by one end thereof, on the end thereof, by a sleeve which has a cup-like design and which sits in the planet carrier.

The planetary drives fall within the class wherein toothed gears, spur gears, or bevel gears are arranged at a radial distance from a central axis, and revolve around this central axis on planetary orbits. The planet gears of one set have a toothed engagement with at least one center gear, and run on a peripheral track about the central axis. Central gears are ring gears and sun gears which each rotate about the central axis. In differentials, two sets of planet gears are included. Center gears are preferably sun gears, each with a toothed engagement with the planet gears of one of the planet sets. The axes of rotation of the planet gears are oriented perpendicular to the central axis in bevel gear planetary drives, and parallel to the central axis in spur gear planetary drives. The planetary drives are mounted on the planet carrier in a manner allowing rotation, wherein the planet carrier is called a differential cage in a differential, and is the aggregate output and the drive shaft. In differentials, the center gears are connected to drive shafts which lead to axles of a vehicle or to vehicle wheels.

Each of the planet gears is mounted on a pin in a manner allowing rotation about an axis of symmetry of the pin, which is also the axis of rotation of the planet gears. As an alternative, the planet gear and the pin are fixed to each other. In this case, the planet pin is mounted in the planet carrier by means of planet bearings. The bearings of the planet gears are sliding bearings, although preferably roller bearings. The roller bearings can optionally be configured with bearing rings, and comprise an outer roller race which is functionally assigned to the pin, as well as an inner roller race which is functionally assigned to the planet gear. The roller races can optionally be constructed on the bearing rings, but preferably directly on the surface of the respective pin, and directly inside the respective planet gear or in the planet carrier. In the class under consideration here, the planet pins are seated and fixed by the ends thereof in sleeves, or are mounted in a manner allowing rotation in these sleeves. In such cases, inner roller races are constructed on the sleeve. The rolling elements are arranged between the roller races, and are preferably needles of a needle bearing.

The pins are hollow in the interiors thereof, at least over a segment, but preferably over the entire length thereof, because they have a lubrication channel which extends along the axis of symmetry of the pin and terminates in a blind end, or passes through the pin along the axis of symmetry. Lubrication bores branch off of the lubrication channel perpendicularly, leading from the lubrication channel to the respective bearing on which the planet gear is mounted.

The pin is mounted by one end thereof, or preferably by both ends, with one end each mounted in a planet carrier. In this case, the pin is mounted by at least one end in a sleeve with a cup-like design, the sleeve encompassing the end of the pin. The sleeve is supported in the planet carrier and the pin is supported via the sleeve in the planet carrier. The sleeve has a base with a hole. The axial end face of the base sits flush against the end of the pin in such a manner that the hole in the base is oriented either concentrically to the opening of the lubrication channel, or radially offset from this opening, and in such a manner that an edge which is the boundary of the hole partially covers the lubrication channel, and the cross-section of the opening of the lubrication channel reduces, but does no entirely cover, the cross-section of the hole, on one radial side thereof, or on all radial sides thereof. When the planet carrier rotates about the central axis, each pin dips once per rotation into an oil sump, and in the process gathers lubricant with the lubrication channel. Moreover, spray oil can pass into the lubrication channel. In planetary drives in the prior art, a large portion of the lubricant is typically conveyed back out of the lubricating channel by centrifugal threes. Only relatively little lubricant remains in the lubrication channels which can be conveyed by centrifugal forces out of the lubrication channel, via the lubricant bores, to the bearing points and to the tooth contact surfaces. The lubrication of the bearing point and the tooth contact surfaces is ineffective, such that the use of a separate pressure lubrication would accordingly be reasonable.

The advantage of the present disclosure is that a large portion of the lubricant is held back by the protruding portion of the edge in the lubrication channel, is prevented from leaving the lubrication channel, and is dammed in place. This portion of lubricant can be forced into the lubricant bores by the centrifugal forces, and guided to the bearing points as well as the tooth contacts, thereby adequately supplying lubricant to the same without additional effort.

In one embodiment, the sleeve has an edge which is constructed on its cup-like base body and proceeds from the same radially like the brim of a hat. This edge has an annular disk shape, is arranged between the planet carrier and the planet gear axially, and axial stop disk for each planet gear. This edge can advantageously be configured with lubricating grooves or other recesses which are suitable for improving the distribution of the lubricant and thereby the lubrication of an axial stop surface of the planet gear on the planet carrier.

BRIEF DESCRIPTION OF THE SEVERAL VIEWS OF THE DRAWINGS

The nature and mode of operation of the disclosure are disclosed, by way of example only, with reference to the accompanying drawing figures in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and, as such, may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

The example embodiments are described below with reference to the following detailed description.

Figure 1:
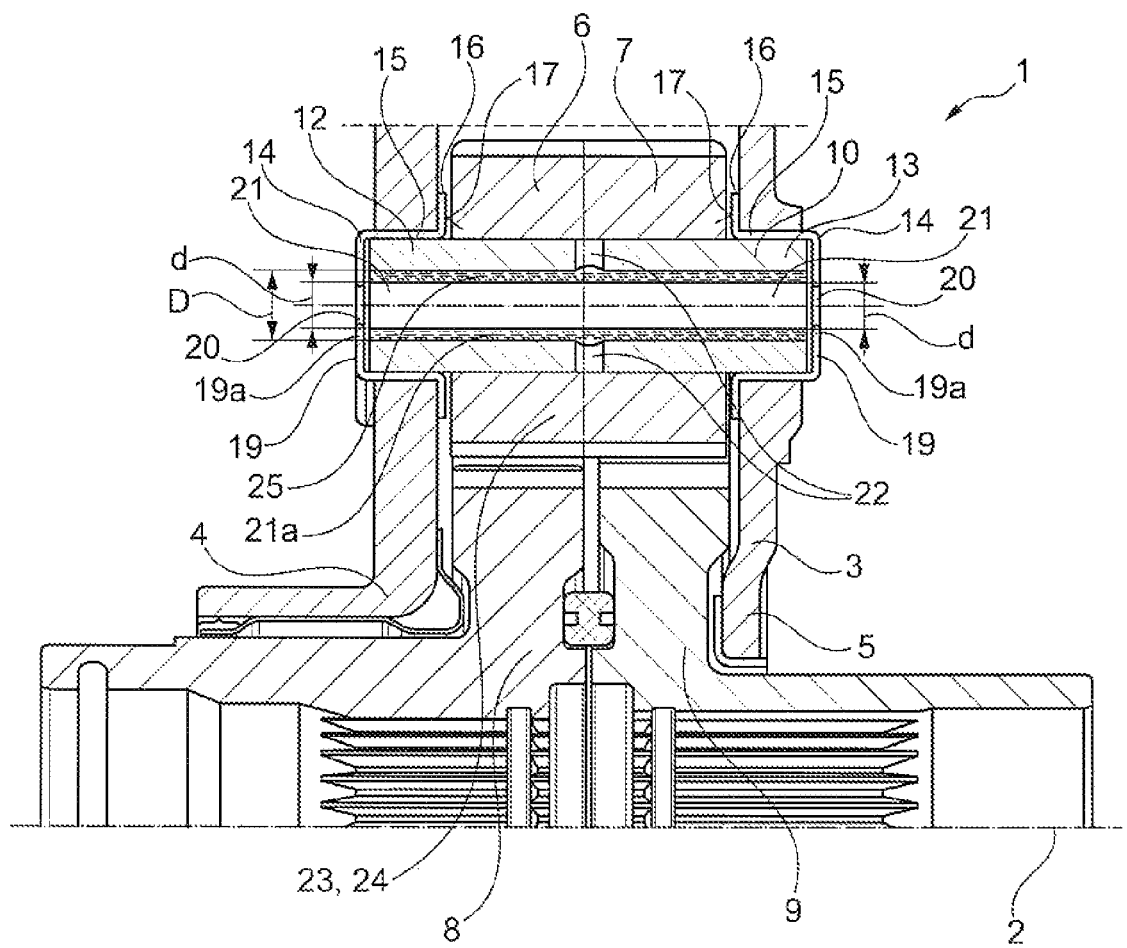
FIG. 1 is a longitudinal cross-sectional view of a planetary drive according to an example embodiment; and, FIG. 2 is a detail of a longitudinal cross-sectional view of a planetary drive according to an example embodiment.

FIG. 1 shows planetary drive 1 which is designed as a spur gear differential, in a longitudinal cross-section along central axis 2 of planetary drive 1. Planetary drive 1 has planet carrier 3 which is formed of two parts 4 and 5. Two sets of planet gears 6 and 7 are mounted in planetary drive 1. In the illustration shown in FIG. 1, only one of the planet gears 6 and 7 is shown in each set. Planetary drive 1, however, has at least three planet gears 6 and 7 in each case. Planet gear 7 in FIG. 1 is covered by planet gear 6, and is therefore shown by a dashed line. Each planet gear 6 of the first set has a toothed engagement with one planet gear 7 of the other set. Planet gears 6 and 7 of the first set also each have a toothed engagement with center gear 8 and/or 9, the same designed as a sun gear. The axes of rotation of center gears 8 and 9 correspond to central axis 2. Planet carrier 3 and center gears 8 and 9 are able to rotate relative to each other about central axis 2.

Each planet gears 6 and 7 is mounted in a manner allowing rotation on pin 10. Each pin 10 is mounted by end 12 in part 4, and by end 13 in other part 5 of planet carrier 3, and for this purpose is press fitted in sleeve 14 which has a socket-like construction. Sleeve 14 has base body 15 and edge 16. Base body 15 and edge 16 are constructed as a single piece from a single material. Edge 16 has the shape of an annular disk and abuts the respective part 4 and/or 5 axially in which sleeve 14 is press fitted. Flat surface 17 of edge 16 lies axially opposite the respective planet gear 6 and/or 7 as an axial glide surface.

Base body 15 of sleeve 14 is formed from hollow cylindrical segment 18 and from base 19. Base 19 has circular hole 20 passing axially through. Hole 20 can also have any other contours.

Pin 10 has a hollow cylindrical design. Lubrication channel 21 runs axially inside each pin 10. At least one lubricant bore 22 proceeds radially from lubrication channel 21, and leads to bearing point 23 where the respective planet gear 6 and/or 7 is mounted by means of at least one glide bearing 24 in a manner allowing rotation on pin 10.

Lubrication channel 21 in this case has a cylindrical interior and diameter D on ends 13 and 14 which is greater than diameter d of hole 20. As such, edge 19a of base 19 covers the cross-section of lubrication channel 21 partially on the edge thereof, to such an extent that lubricant reservoir 21a is formed in lubrication channel 21, in which retained lubricant is initially held back by edge 19a, and from there the retained lubricant can be conveyed by centrifugal forces, via lubricant bore 22, to bearing point 23.

Figure 2:
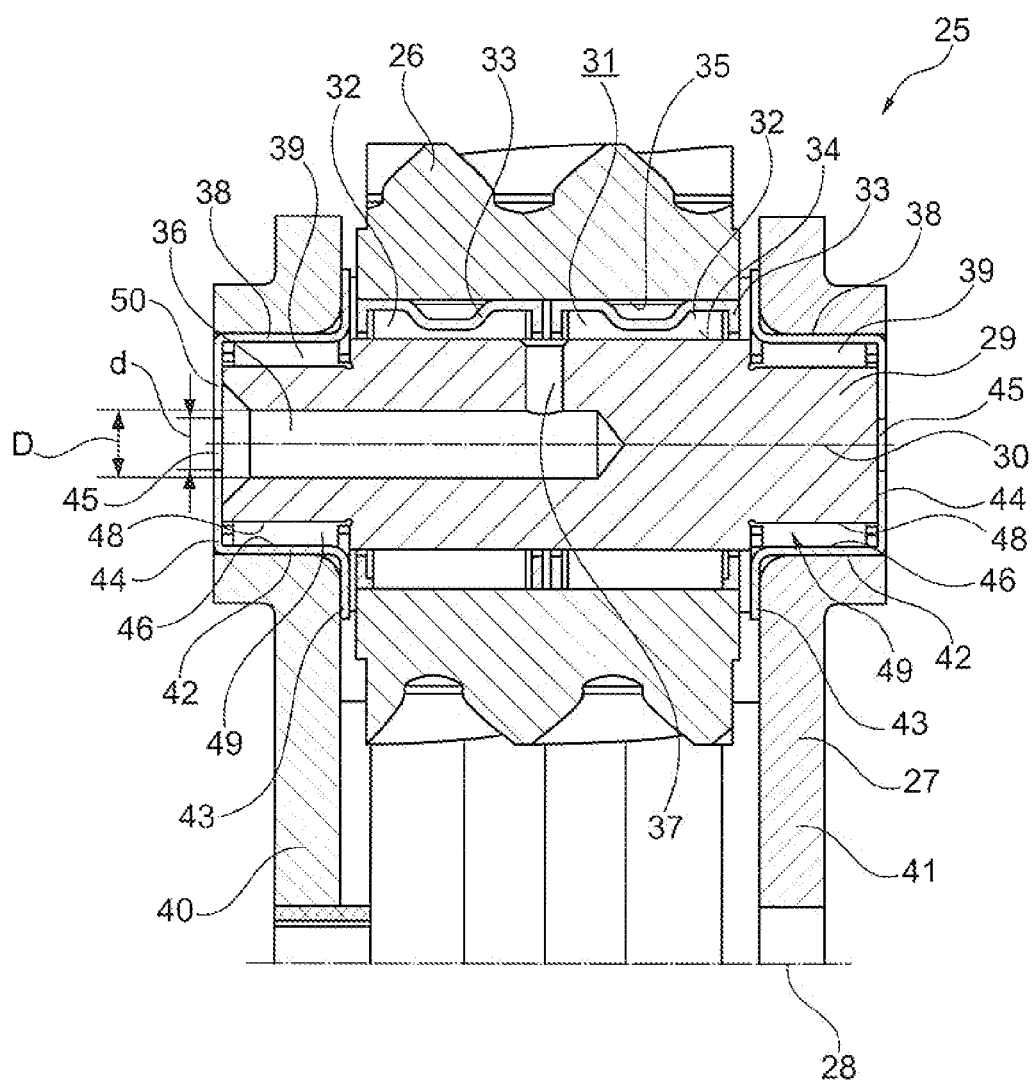

FIG. 2 shows planetary drive 25 with a set of planet gears 26 on planet carrier 27, in a detail of a longitudinal cross-section along central axis 28. Planet gears 26 are arranged at a radial distance from central axis 28. In the illustration according to FIG. 2, only one of the planet gears 26 is illustrated. Planetary drive 25, however, has at least three planet gears 26 distributed around central axis 28 at a radial distance therefrom. Planet gears 26 are included for the purpose of engaging with one or both of the center gears which are not illustrated in FIG. 2, of which one is a sun gear and the other is a ring gear, the axes of rotation of which are central axis 28.

Each of the planet gears 26 is mounted by means of a two-row roller bearing 31 on pin 29 in a manner allowing rotation about axis of symmetry 30 of pin 29. Roller bearing 31 is formed from two rows of rollers 32, of which each row is guided in cage 33. Roller bearing 31 also has outer roller race 34 which is designed directly on the surface of pin 29, and inner roller race 35 directly on the surface in the bore of the respective planet gear 26.

Pin 29 is configured with internal lubrication channel 36 which extends along axis of symmetry 30. Lubrication channel 36 is a blind hole, wherein at least one lubricant bore 37 proceeds from the same and opens into outer roller race 34 in roller bearing 31.

Pin 29 is mounted on both ends in planet carrier 27 in cup-like sleeve 38 by means of further roller bearing 39. One sleeve 38 per end of pin 29 surrounds the end of pin 29 peripherally, and covers a part of the end face thereof. One sleeve 38 is press fitted into part 40, and the other into part 41, of planet carrier 27. Each sleeve 38 has hollow cylindrical base body 42, annular disk-shaped edge 43, and base 44. Base 44 has hole 45. Annular disk-shaped edge 43 is arranged axially between one of the parts 40 and/or 41 of planet carrier 27 and planet gear 26, and axial limit stop as well as axial glide surface for the respective planet gear 26 [sic]. Hollow cylindrical base body 42 is configured with one of the inner roller races 46 of roller bearing 39. Outer roller race 48 of roller bearing 39 is constructed on the surface of pin 29. Rollers 49 of roller bearing 39 are arranged radially between races 46 and 48.

At the end of pin 29 from which lubrication channel 36 proceeds, hole 45 adjoins lubrication channel 36 by the end face of pin 29. Here, edge 50 of hole 45 overlaps the opening of lubrication channel 36 on the edge thereof in such a manner that the cross-section of lubrication channel 36 is reduced at its opening to the cross-section of hole 45. Diameter d of hole 45 is accordingly smaller than diameter D of lubrication channel 36.

Thus, it is seen that the objects of the disclosure are efficiently obtained, although modifications and changes should be readily apparent to those having ordinary skill in the art, which modifications are intended to be within the spirit and scope of the claims. It also is understood that the foregoing description is illustrative and should not be considered as limiting. Therefore, other embodiments are possible without departing from the spirit and scope of the claims.

LIST OF REFERENCE NUMBERS

1 Planetary drive
2 Central axis
3 Planet carrier
4 Part of the planet carrier
5 Part of the planet carrier
6 Planet gear
7 Planet gear
8 Center gear
9 Center gear
10 Pin
12 End
13 End
14 Sleeve
15 Base body
16 Edge
17 Flat surface
18 Segment
19 Base
19a Edge of the base
20 Hole
21 Lubrication channel
21a Lubricant reservoir
22 Lubricant bore
23 Bearing point
24 Glide bearing
25 Planetary drive
26 Planet gear
27 Planet carrier
28 Central axis
29 Pin
30 Axis of symmetry
31 Roller bearing
32 Roller
33 Cage
34 Outer race
35 Inner race
36 Lubrication channel
37 Lubricant bore
38 Sleeve
39 Roller bearing
40 Part of the planet carrier
41 Part of the planet carrier
42 Base body
43 Annular diskshaped edge
44 Base
45 Hole
46 Inner race
47 Roller
48 Outer race
49 Roll
50 Edge of the hole

What is claimed is:

1. A planetary drive, comprising:
a central axis;
a first set of first planet gears on a planet carrier arranged at a radial distance from the central axis;
a first center gear having the central axis as its axis of rotation, each first planet gear having a toothed engagement with the first center gear;
a pin having a first end mounted on the planet carrier and received on the first end by a sleeve that sits in and is supported by the planet carrier, where the pin is operatively arranged to receive each first planet gear in a manner allowing rotation about an axis of symmetry;
a hole in a base of the sleeve, where the base has a first edge forming a boundary of the hole; and,
an internal lubrication channel having a second edge on an end face opening and extending along the axis of symmetry of the pin, where the internal lubrication channel at least partially overlaps with the first edge thereby reducing a cross-section of the end face opening of the internal lubrication channel.

2. The planetary drive recited in claim 1, the sleeve further comprising:
a radial edge arranged between the planet carrier and the planet gear axially, wherein:
each first planet gear is mounted in the sleeve by the pin in a manner allowing rotation.

3. The planetary drive recited in claim 1, wherein the pin further comprises a second end and the first and second ends sit in the sleeve.

4. The planetary drive recited in claim 1, wherein the sleeve is fixed on the pin.

5. The planetary drive recited in claim 1, wherein the pin is mounted in the sleeve in a manner allowing rotation.

6. The planetary drive recited in claim 5, wherein the pin is mounted in the sleeve by at least one roller bearing.

7. The planetary drive recited in claim 1, further comprising:
a set of second planet gears; and,
a second center gear wherein:
each second planet gear has a toothed engagement with a first planet gear and the second center gear, and
each second planet gear is mounted separately on a further pin.

8. The planetary drive recited in claim 7, wherein the first center gear and the second center gear are sun gears of a planetary differential.

* * * * *